(12) United States Patent
Kusafuka et al.

(10) Patent No.: US 11,099,382 B2
(45) Date of Patent: Aug. 24, 2021

(54) DISPLAY APPARATUS, MOBILE OBJECT, AND LIGHT SOURCE DEVICE

(71) Applicant: KYOCERA Corporation, Kyoto (JP)

(72) Inventors: Kaoru Kusafuka, Tokyo (JP); Yusuke Hayashi, Fort Lee, NJ (US); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 268 days.

(21) Appl. No.: 15/778,636

(22) PCT Filed: Nov. 21, 2016

(86) PCT No.: PCT/JP2016/084512
§ 371 (c)(1),
(2) Date: May 24, 2018

(87) PCT Pub. No.: WO2017/090568
PCT Pub. Date: Jun. 1, 2017

(65) Prior Publication Data
US 2018/0341108 A1    Nov. 29, 2018

(30) Foreign Application Priority Data

Nov. 26, 2015   (JP) .............................. JP2015-230911
Aug. 29, 2016   (JP) .............................. JP2016-167055

(51) Int. Cl.
*G02B 27/01*     (2006.01)
*B60K 35/00*     (2006.01)
*G02B 5/02*      (2006.01)

(52) U.S. Cl.
CPC .............. *G02B 27/01* (2013.01); *B60K 35/00* (2013.01); *G02B 5/0278* (2013.01); *G02B 27/0101* (2013.01); *B60K 2370/1529* (2019.05); *B60K 2370/332* (2019.05); *B60K 2370/334* (2019.05); *B60K 2370/347* (2019.05)

(58) Field of Classification Search
CPC ........ G02B 2027/0118; G02B 27/0101; G02B 27/01; G02B 2027/014; G02B 27/0172; G02B 2027/0138; G02B 2027/0178; G02B 2027/0121; G02B 2027/0174; G02B 30/27; G02B 6/002; G02B 6/0045; G02B 6/0053; G02B 6/0055; G02B 2027/0187; G02B 27/0093; G02B 2027/0141; G02B 2027/0145; G02B 26/10; G02B 27/017
USPC ................................... 359/619–633
See application file for complete search history.

(56) References Cited

U.S. PATENT DOCUMENTS

| | | | |
|---|---|---|---|
| 8,403,546 B2 | 3/2013 | Kurokawa | |
| 9,892,643 B2 | 2/2018 | Aoki | |
| 2011/0075434 A1 | 3/2011 | Kurokawa | |
| 2012/0086623 A1* | 4/2012 | Takagi | ............... G02B 27/0172 345/7 |
| 2016/0379498 A1 | 12/2016 | Aoki | |

FOREIGN PATENT DOCUMENTS

| | | |
|---|---|---|
| JP | 2011-076832 A | 4/2011 |
| JP | 2011-090217 A | 5/2011 |

(Continued)

*Primary Examiner* — Brandi N Thomas
(74) *Attorney, Agent, or Firm* — Studebaker & Brackett PC

(57) ABSTRACT

A display apparatus allows a user to visually recognize a virtual image. The virtual image has luminance characteristics according to which a dependence of luminance on viewing angle changes along a certain direction.

7 Claims, 13 Drawing Sheets

(56) References Cited

FOREIGN PATENT DOCUMENTS

| JP | 2013-037260 A | 2/2013 |
|---|---|---|
| JP | 2015-014681 A | 1/2015 |
| JP | 2015-168382 A | 9/2015 |
| JP | 2016-218391 A | 12/2016 |

* cited by examiner

ID $11,099,382 B2

DISPLAY APPARATUS, MOBILE OBJECT, AND LIGHT SOURCE DEVICE

CROSS REFERENCE TO RELATED APPLICATION

This application claims priority to and the benefit of Japanese Patent Application No. 2015-230911 filed on Nov. 26, 2015 and Japanese Patent Application No. 2016-167055 filed on Aug. 29, 2016, the entire disclosures of which are incorporated herein by reference.

TECHNICAL FIELD

The present disclosure relates to a display apparatus, a mobile object, and a light source device.

BACKGROUND

Apparatuses that are mounted on mobile objects such as vehicles to allow the users such as drivers of the mobile objects to visually recognize virtual images are conventionally known.

SUMMARY

A display apparatus according to an aspect of the present disclosure allows a user to visually recognize a virtual image. The virtual image has luminance characteristics according to which a dependence of luminance on viewing angle changes along a certain direction.

A display apparatus according to an aspect of the present disclosure allows a user to visually recognize a virtual image of an image. The display apparatus comprises a light source device and one or more optical members. The light source device has a display surface for displaying the image. The one or more optical members are configured to cause projection light of the image from the display surface to reach a certain region in a real space. A first direction in which luminance of projection light from a first region in the display surface is maximum and a second direction in which luminance of projection light from a second region in the display surface is maximum are different.

A mobile object according to an aspect of the present disclosure via which a user visually recognizes a virtual image of an image. The mobile object comprises a light source device and one or more optical members. The light source device has a display surface for displaying the image. The one or more optical members are configured to cause projection light of the image from the display surface to reach a certain region in a real space. A first direction in which luminance of projection light from a first region in the display surface is maximum and a second direction in which luminance of projection light from a second region in the display surface is maximum are different.

A light source device according to an aspect of the present disclosure has a display surface for displaying an image. A first direction in which luminance of projection light from a first region in the display surface is maximum and a second direction in which luminance of projection light from a second region in the display surface is maximum are different.

DETAILED DESCRIPTION

An embodiment of the present disclosure is described below, with reference to drawings.

(Overview of Mobile Object and Display Apparatus)

Figure 1:
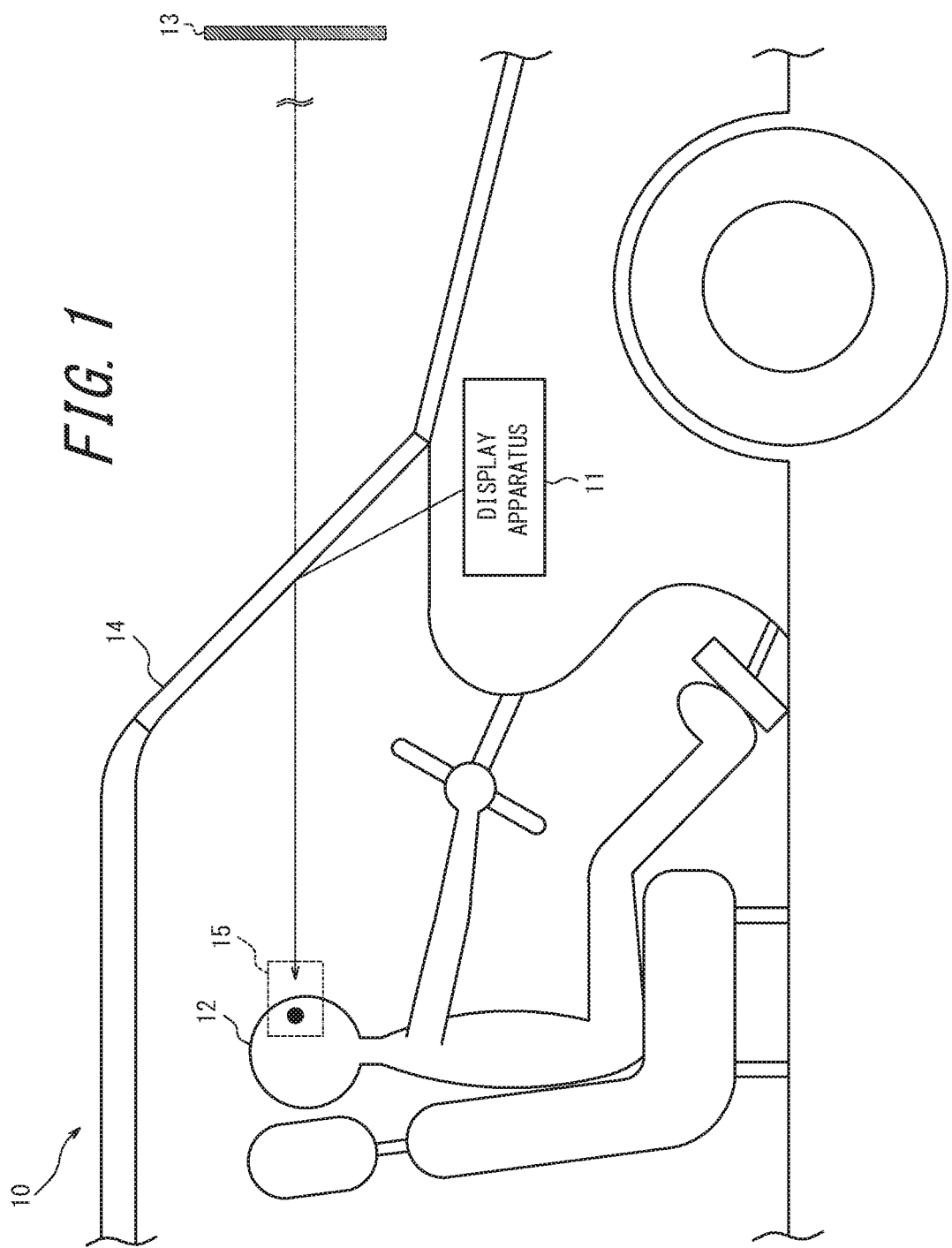
FIG. 1 is a diagram illustrating a mobile object and a display apparatus according to an embodiment of the present disclosure.

A mobile object 10 and a display apparatus 11 according to an embodiment are described below, with reference to FIG. 1. The mobile object 10 includes a display apparatus 11.

The mobile object 10 may be, for example, a vehicle, a ship, or an aircraft. Vehicles may include, for example, motor vehicles, industrial vehicles, railed vehicles, domestic vehicles, and fixed-wing airplanes running on runways. Motor vehicles may include, for example, cars, trucks, buses, two-wheeled vehicles, and trolleybuses. Industrial vehicles may include, for example, industrial vehicles for agriculture and construction. Industrial vehicles may include, for example, forklifts and golf carts. Industrial vehicles for agriculture may include, for example, tractors, cultivators, transplanters, binders, combines, and lawn mowers. Industrial vehicles for construction may include, for example, bulldozers, scrapers, power shovels, crane trucks, dump trucks, and road rollers. Vehicles may include human-powered vehicles. The classifications of vehicles are not limited to the above-mentioned examples. For example, motor vehicles may include industrial vehicles that can run on roads. The same type of vehicle may belong to a plurality of classifications. Ships may include, for example, personal watercraft, boats, and tankers. Aircraft may include, for example, fixed-wing airplanes and rotary-wing airplanes.

The display apparatus 11 may be installed in, for example, a dashboard of the mobile object 10. For example, the display apparatus 11 functions as a head-up display that allows a user 12 such as a driver of the mobile object 10 to visually recognize a virtual image 13 of a requested image. In detail, in an embodiment, the display apparatus 11 emits projection light of an image toward a certain region of a first optical member 14 included in the mobile object 10. In an embodiment, the first optical member 14 may be a windshield. In another embodiment, the first optical member 14 may be a combiner. The projection light of the image will be described in detail later. The projection light of the image reflected from the certain region of the first optical member 14 reaches an eyebox 15. The eyebox 15 is a spatial region in a real space in which the eyes of the user 12 are expected to be present based on, for example, the physical constitution, posture, and posture changes of the user 12. The arrow in FIG. 1 indicates a path through which part of the projection light of the image emitted from the display apparatus 11 reaches the eyebox 15. In the case where the eyes of the user 12 are present in the eyebox 15, the user 12 can visually recognize the virtual image 13 of the image through the projection light of the image reaching the eyebox 15. For example, the virtual image 13 may be visually recognized forward from the mobile object 10.

(Structure of Display Apparatus)

Figure 2:
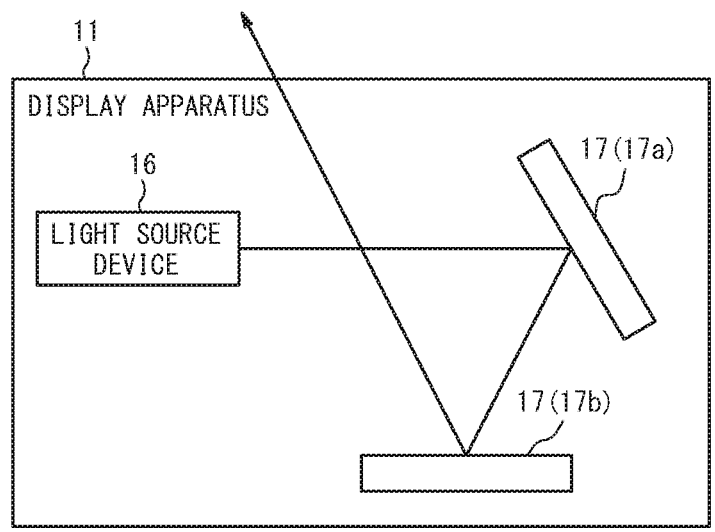
FIG. 2 is a diagram illustrating the schematic structure of the display apparatus in FIG. 1.

The display apparatus 11 according to an embodiment is described in detail below, with reference to FIG. 2. The display apparatus 11 includes a light source device 16 and one or more second optical members 17. FIG. 2 illustrates a structure in which the display apparatus 11 includes two second optical members 17a and 17b, as an example.

The light source device 16 emits the projection light of the image in the display apparatus 11. The structure of the light source device 16 will be described in detail later.

The second optical members 17a and 17b cause the projection light of the image emitted from the light source device 16 to reach the outside of the display apparatus 11. In an embodiment, at least one of the second optical members 17a and 17b may be a mirror. The arrow in FIG. 2 indicates a path through which part of the projection light of the image emitted from the light source device 16 is reflected by the second optical members 17a and 17b, passes through a window portion provided in a housing of the display apparatus 11, and reaches the outside of the display apparatus 11. The projection light of the image that has reached the outside of the display apparatus 11 reaches the certain region of the first optical member 14 included in the mobile object 10, as illustrated in FIG. 1. In another embodiment, at least one of the second optical members 17a and 17b may be a lens. In another embodiment, one of the second optical members 17a and 17b may be a mirror, and the other one of the second optical members 17a and 17b may be a lens.

The second optical members 17a and 17b may further function as a magnifying optical system that magnifies the projection light of the image. In an embodiment, at least one of the second optical members 17a and 17b may be a mirror having a convex surface or a concave surface in at least part of a surface which the projection light of the image reaches. In another embodiment, at least one of the second optical members 17a and 17b may be a lens having a convex surface or a concave surface in at least part of a surface from which the projection light of the image enters or exits. At least part of the convex surface or the concave surface may be spherical or aspherical.

(Structure of Light Source Device)

Figure 3:
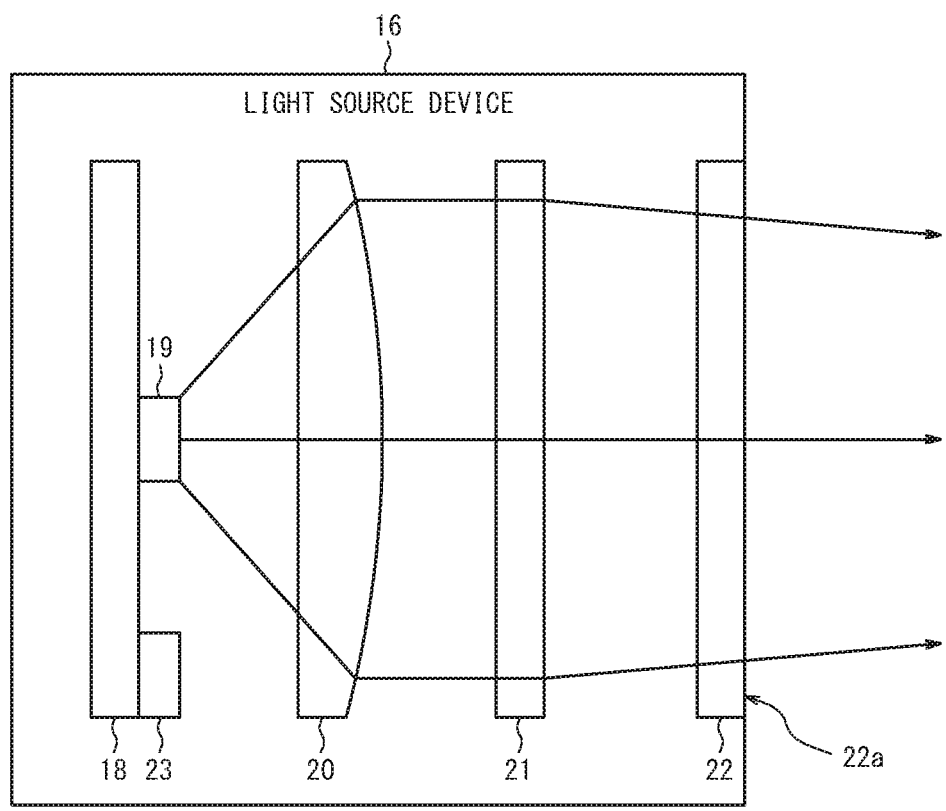
FIG. 3 is a sectional diagram along an optical axis of a light source device in FIG. 2.

The light source device 16 according to an embodiment is described in detail below, with reference to FIG. 3. The light source device 16 includes a substrate 18, a light source element 19, a lighting optical system, a display 22, and a controller 23. The lighting optical system includes a third optical member 20 and a fourth optical member 21. The substrate 18, the third optical member 20, the fourth optical member 21, and the display 22 are arranged in fixed manner in the light source device 16. The light source element 19 and the controller 23 are provided on the substrate 18.

The light source element 19 includes, for example, one or more light emitting diodes (LEDs) or laser devices. The light source element 19 emits light under the control of the controller 23.

The third optical member 20 includes, for example, a collimator lens. The third optical member 20 collimates the light incident from the light source element 19. The collimated light is approximately parallel light that travels in the direction of the optical axis of the third optical member 20.

The fourth optical member 21 includes, for example, a lens. In an embodiment, the fourth optical member 21 may include a Fresnel lens. The fourth optical member 21 is located inside the light source device 16 so that the optical axis of the fourth optical member 21 and the optical axis of the third optical member 20 approximately match. The fourth optical member 21 refracts the light collimated as a result of passing through the third optical member 20. The refraction of the light by the fourth optical member 21 can realize the below-mentioned luminance characteristics of the virtual image 13 visually recognized by the user 12. In other words, the fourth optical member 21 is designed so that the below-mentioned luminance characteristics of the virtual image 13 are obtained.

The display 22 includes, for example, a transmissive liquid crystal device such as a liquid crystal display (LCD). The transmissive liquid crystal device has, for example, a polarization filter, a glass substrate, an electrode, an oriented film, a liquid crystal display element, and a color filter. The display 22 has a display surface 22a for displaying an image under the control of the controller 23. The display 22 may be located so that the normal direction of the display surface 22a of the display 22 and the direction of the optical axis of the third optical member 20 or the fourth optical member 21 approximately match. The display 22 transmits or blocks the light refracted as a result of passing through the fourth optical member 21, to emit the projection light of the image displayed on the display surface 22a to the outside of the light source device 16.

The controller 23 includes one or more processors. The processors may include a general-purpose processor that performs a specific function by reading a specific program, and a dedicated processor dedicated to a specific process. The dedicated processor may include an application specific integrated circuit (ASIC). Each processor may include a programmable logic device (PLD). The PLD may include a field-programmable gate array (FPGA). The controller 23 may be any of a system on a chip (SoC) or a system in a package (SiP) in which one or more processors cooperate with each other. The controller 23 controls the operation of the whole light source device 16. For example, the controller 23 causes the light source element 19 to emit light. The controller 23 causes the display 22 to display images. The images may include text or graphics.

As a modification, the light source device 16 may further include a diffuser between the fourth optical member 21 and the display 22. A light source device 16a according to a first modification of the light source device 16 is described in detail below, with reference to FIG. 4. In the light source device 16a, the same components as those in the light source device 16 are given the same reference signs, and their descriptions are omitted.

The light source device 16a includes the substrate 18, the light source element 19, a lighting optical system, the display 22, and the controller 23. The lighting optical system includes a first lens 20a as the third optical member 20, a second lens 21a as the fourth optical member 21, and a diffuser 27.

Figure 4:
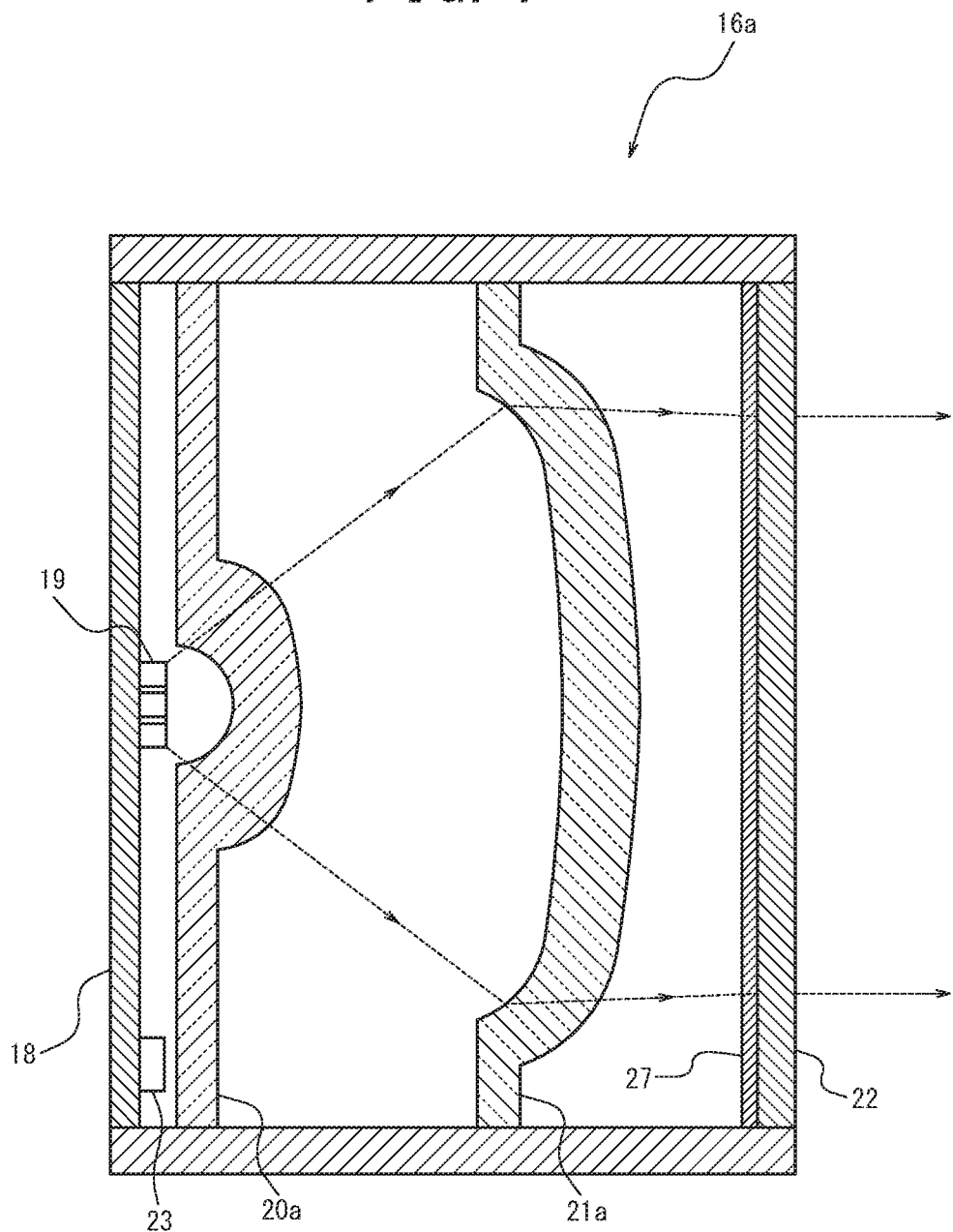
FIG. 4 is a sectional diagram along an optical axis of a light source device according to a first modification.

The light source element 19 illustrated in FIG. 4 is composed of a plurality of LEDs. The light source element 19 may be located on the substrate 18 near a point of intersection with a perpendicular line from the center of the display 22, as illustrated in FIG. 4. With such arrangement, the light source element 19 can be regarded as a point light source. This eases light distribution by the first lens 20a and the second lens 21a.

The diffuser 27 is provided so as to cover the surface of the display 22 on the light source element 19 side. The diffuser 27 diffusively transmits the light from the second lens 21a, and irradiates the display 22.

In the light source device 16a, the below-mentioned luminance characteristics of the virtual image 13 can be realized by adjusting the light distribution by the lighting optical system and in particular the first lens 20a and the second lens 21a.

Figure 5:
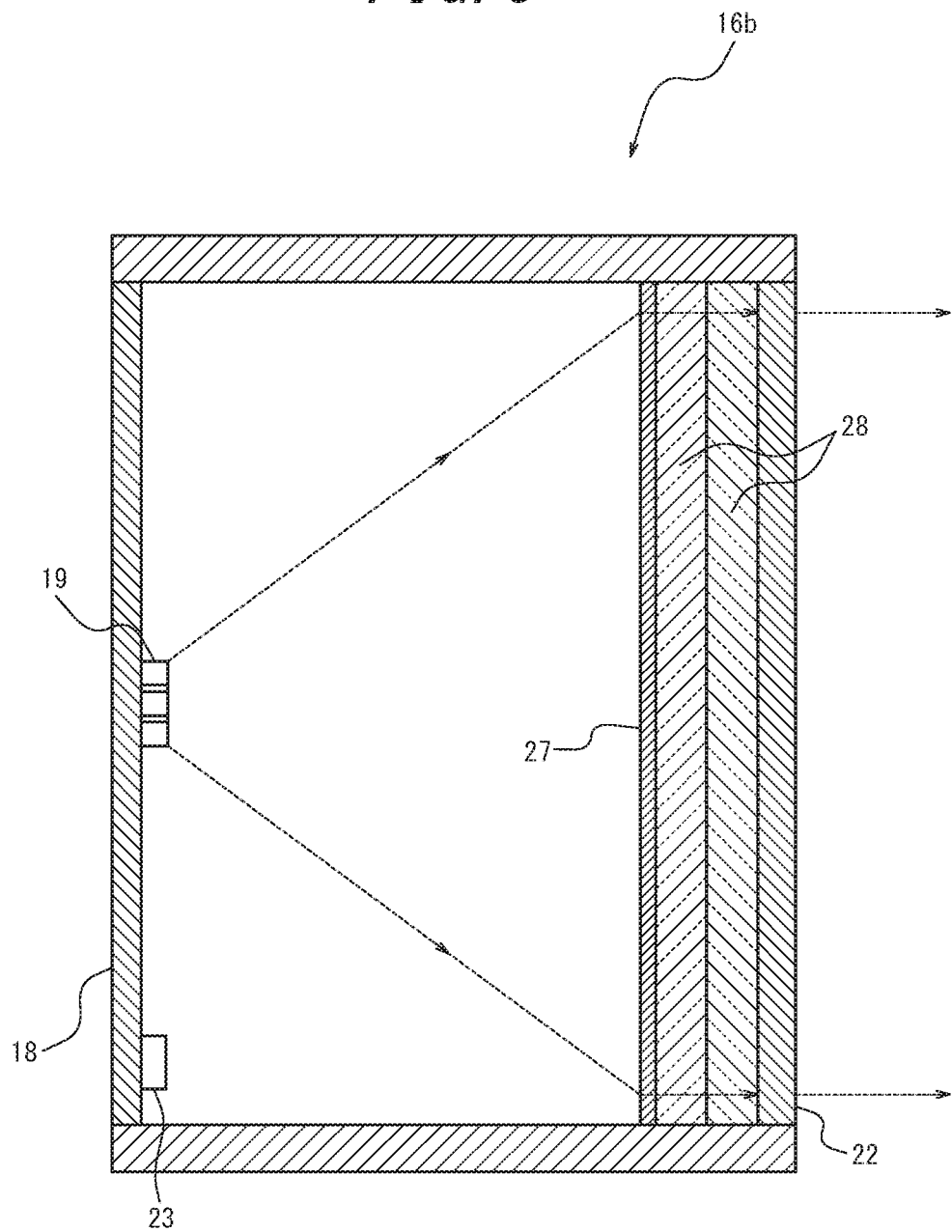
FIG. 5 is a sectional diagram along an optical axis of a light source device according to a second modification.

A light source device 16b according to a second modification of the light source device 16 is described in detail below, with reference to FIG. 5. In the light source device 16b, the same components as those in the light source device 16 or the light source device 16a are given the same reference signs, and their descriptions are omitted.

The light source device 16b includes the substrate 18, a lighting optical system, the light source element 19, the display 22, and the controller 23. The lighting optical system includes the diffuser 27 and a prism sheet 28.

The diffuser 27 is provided so as to cover the surface of the display 22 on the light source element 19 side. The diffuser 27 diffusively transmits the light incident from the light source element 19. The diffusively transmitted light enters the prism sheet 28.

The prism sheet 28 is located between the display 22 and the diffuser 27. The prism sheet 28 collimates the light diffusively transmitted from the diffuser 27. The collimated light enters the display 22 perpendicularly. The surface of the prism sheet 28 on the display 22 side has prism projections arranged along one direction in a plane parallel to the display 22. The prism sheet 28 collimates the light along the arrangement direction of the prism projections. At least two prism sheets 28 are disposed so that the prism projection arrangements of the respective prism sheets 28 are orthogonal to each other.

In the light source device 16b, the below-mentioned luminance characteristics of the virtual image 13 can be realized by adjusting the light distribution by the lighting optical system and in particular the prism sheet 28.

(Luminance Characteristics)

The luminance characteristics of the virtual image 13 which the display apparatus 11 according to an embodiment allows the user 12 to visually recognize, that is, the luminance characteristics of the display 22 included in the light source device 16 in the display apparatus 11, are described below, with reference to FIGS. 6 and 7. As an overview, in the case where the user 12 visually recognizes the virtual image 13 from any position in the eyebox 15, the virtual image 13 approximately uniform in luminance, i.e. the virtual image 13 with reduced luminance unevenness, is visually recognized. This is described in detail below.

Figure 6:
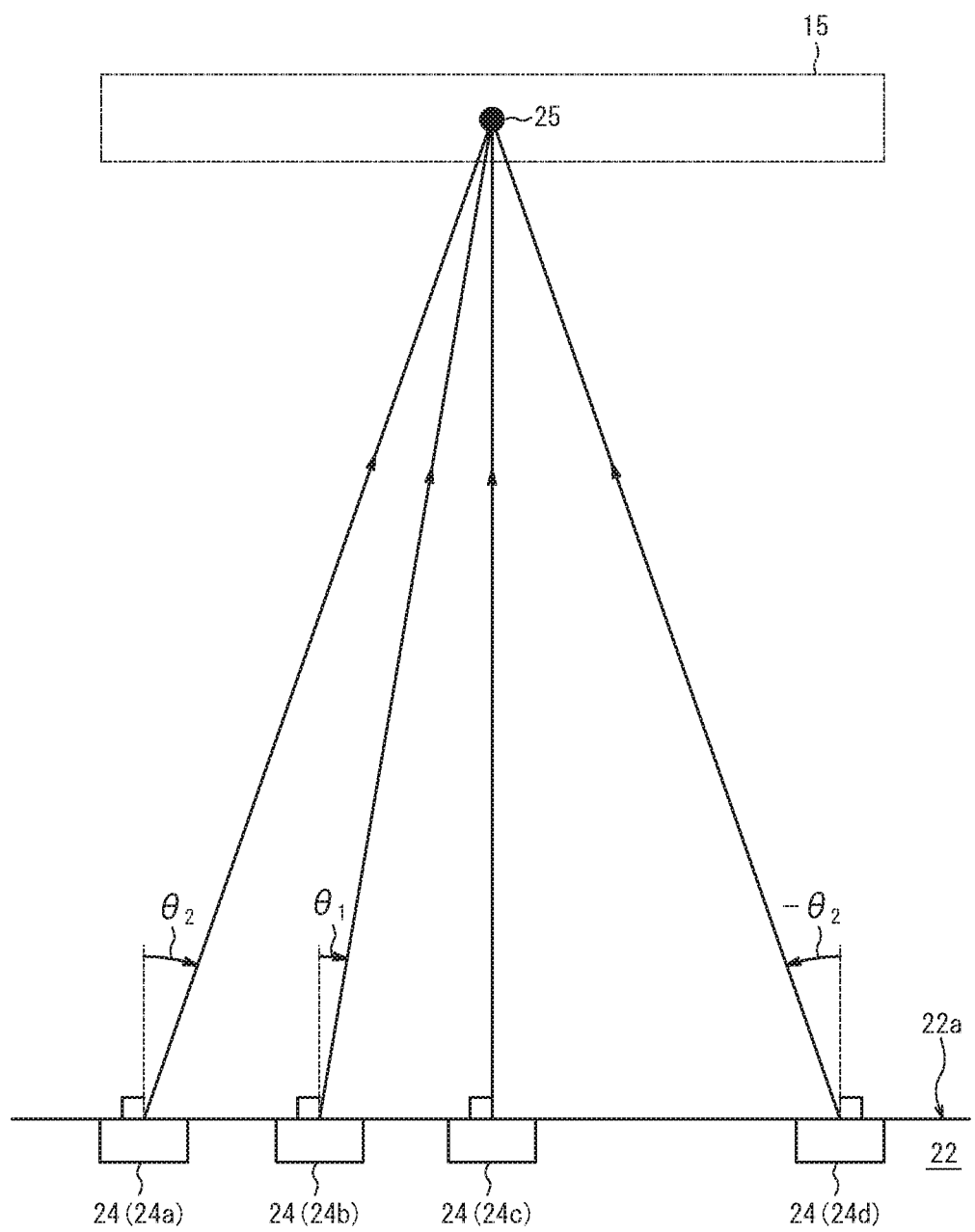
FIG. 6 is a sectional diagram of a display included in the light source device.

For example as illustrated in FIG. 6, in the case of assuming many micro regions 24 in the display surface 22a of the display 22, the direction from each micro region 24 toward a first position 25 in the eyebox 15 and the direction in which the luminance of projection light from the micro region 24 is at a maximum value α approximately match. Accordingly, in the case where the user 12 visually recognizes the virtual image 13 from the first position 25 in the eyebox 15, the virtual image 13 whose luminance is approximately uniform at the maximum value α is visually recognized. The members present between the light source device 16 and the eyebox 15 are not illustrated in FIG. 6, for the sake of simplicity. FIG. 6 illustrates a first region 24a, a second region 24b, a third region 24c, and a fourth region 24d, from among the many micro regions 24. The foot of a perpendicular line from the first position 25 to the display surface 22a coincides with the third region 24c. Part of the image displayed on the display surface 22a can be displayed in each micro region 24. For example, the first region 24a is a region in which a first part of the image is displayed on the display surface 22a. The second region 24b is a region in which a second part of the image is displayed on the display surface 22a. The third region 24c is a region in which a third part of the image is displayed on the display surface 22a. The fourth region 24d is a region in which a fourth part of the image is displayed on the display surface 22a.

In detail, the luminance of projection light (first projection light) from the first region 24a is at the maximum value α in a direction (first direction) inclined from the normal direction of the first region 24a toward the third region 24c by $+\theta_2$.

The luminance of projection light (second projection light) from the second region 24b is at the maximum value α in a direction (second direction) inclined from the normal direction of the second region 24b toward the third region 24c by $+\theta_1$. Here, the distance (first distance) between the first region 24a and the third region 24c is longer than the distance (second distance) between the second region 24b and the third region 24c. Therefore, the absolute value of the angle $\theta_2$ (first angle) between the normal direction of the first region 24a and the direction in which the luminance of projection light from the first region 24a is at the maximum value α is greater than the absolute value of the angle $\theta_1$ (second angle) between the normal direction of the second region 24b and the direction in which the luminance of projection light from the second region 24b is at the maximum value α.

The luminance of projection light (third projection light) from the third region 24c is at the maximum value α in the normal direction of the third region 24c.

The luminance of projection light (fourth projection light) from the fourth region 24d is at the maximum value α in a direction inclined from the normal direction of the fourth region 24d toward the third region 24c by $-\theta_2$. Here, the distance between the fourth region 24d and the third region 24c is the same as the distance between the first region 24a and the third region 24c.

Figure 7:
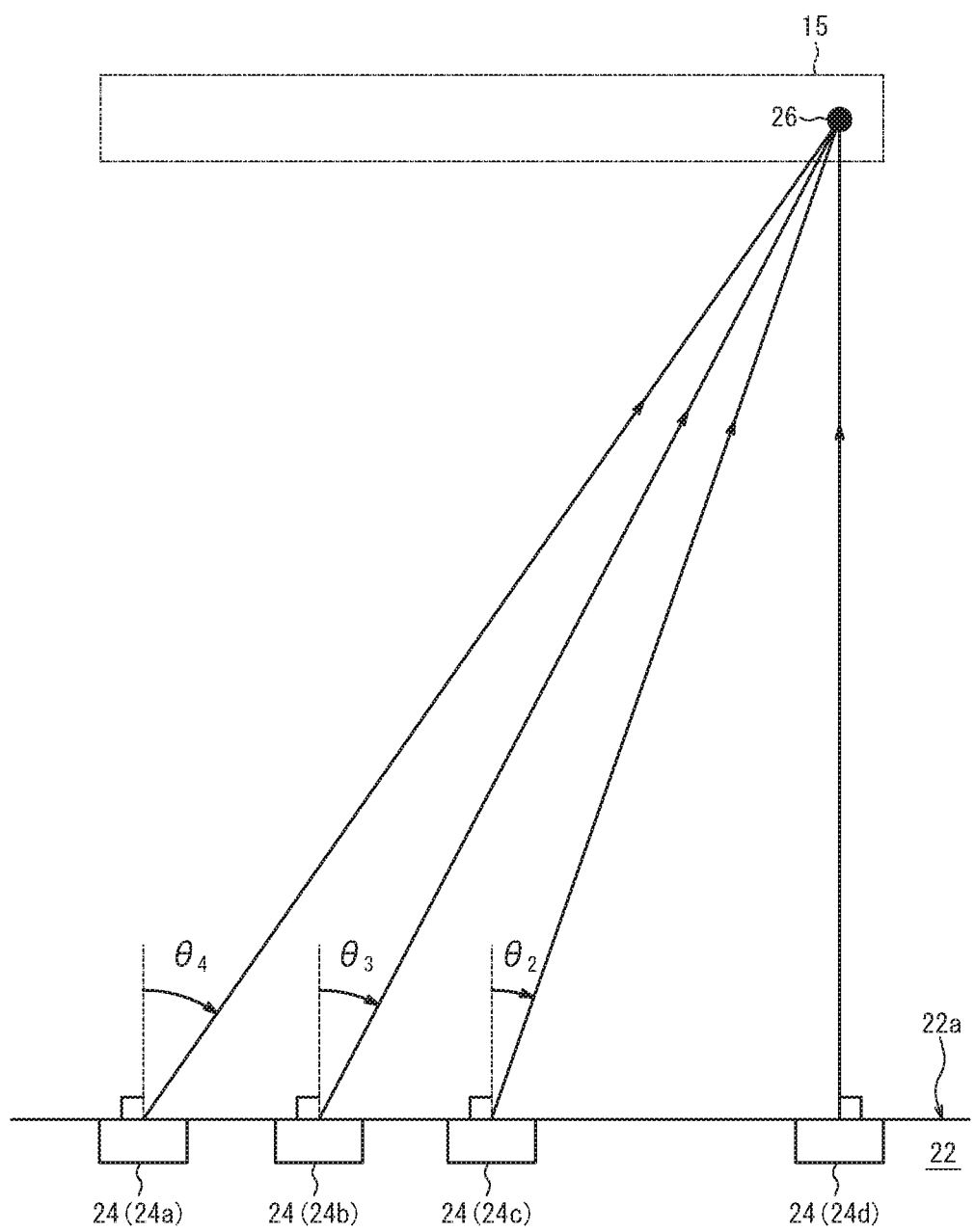
FIG. 7 is a sectional diagram of the display included in the light source device.

For example as illustrated in FIG. 7, the direction from each micro region 24 toward a second position 26 in the eyebox 15 and the direction in which the luminance of projection light from the micro region 24 is at a value β lower than the maximum value α approximately match. Accordingly, in the case where the user 12 visually recognizes the virtual image 13 from the second position 26 in the eyebox 15, the virtual image 13 whose luminance is approximately uniform at the value β lower than the maximum value α is visually recognized. The members present between the light source device 16 and the eyebox 15 are not illustrated in FIG. 7, for the sake of simplicity. FIG. 7 illustrates the first region 24a, the second region 24b, the third region 24c, and the fourth region 24d, from among the many micro regions 24. The foot of a perpendicular line from the second position 26 to the display surface 22a coincides with the fourth region 24d.

In detail, the luminance of projection light from the first region 24a is at the value β in a direction inclined from the normal direction of the first region 24a toward the fourth region 24d by +θ$_4$.

The luminance of projection light from the second region 24b is at the value β in a direction inclined from the normal direction of the second region 24b toward the fourth region 24d by +θ$_3$. Here, the distance between the first region 24a and the fourth region 24d is longer than the distance between the second region 24b and the fourth region 24d. Therefore, the absolute value of the angle θ$_4$ between the normal direction of the first region 24a and the direction in which the luminance of projection light from the first region 24a is at the value β is greater than the absolute value of the angle θ$_3$ between the normal direction of the second region 24b and the direction in which the luminance of projection light from the second region 24b is at the value β.

The luminance of projection light from the third region 24c is at the value β in a direction inclined from the normal direction of the third region 24c toward the fourth region 24d by +θ$_2$. Here, the distance between the second region 24b and the fourth region 24d is longer than the distance between the third region 24c and the fourth region 24d. Therefore, the absolute value of the angle θ$_3$ between the normal direction of the second region 24b and the direction in which the luminance of projection light from the second region 24b is at the value β is greater than the absolute value of the angle θ$_2$ between the normal direction of the third region 24c and the direction in which the luminance of projection light from the third region 24c is at the value β.

The luminance of projection light from the fourth region 24d is at the value β in the normal direction of the fourth region 24d.

Figure 8:
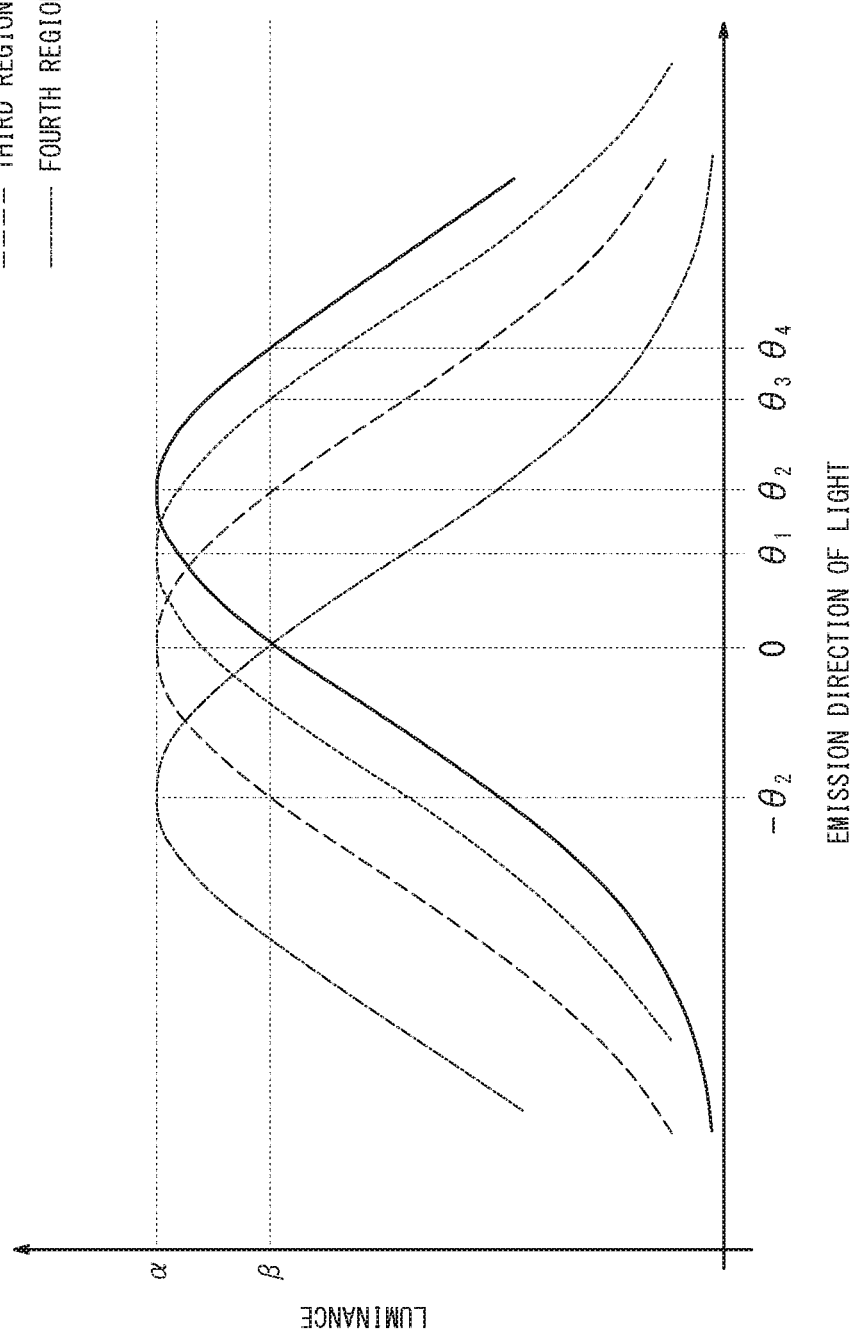
FIG. 8 is a graph illustrating the relationship between the emission direction of light from each micro region in a display surface of the light source device and the luminance of light from the micro region.

FIG. 8 is a graph illustrating the luminance characteristics of the first region 24a to the fourth region 24d described above. The horizontal axis in FIG. 8 represents the emission direction of projection light indicated by the angle with respect to the normal direction of the display surface 22a. The vertical axis in FIG. 8 represents the luminance of projection light.

For example, the projection light from the first region 24a has luminance characteristic according to which the luminance is at the maximum value α at its peak in the emission direction inclined from the normal direction of the first region 24a by +θ$_2$, and is at the value β in the emission direction inclined from the normal direction of the first region 24a by +θ$_4$.

The projection light from the second region 24b has luminance characteristic according to which the luminance is at the maximum value α at its peak in the emission direction inclined from the normal direction of the second region 24b by +θ$_1$, and is at the value β in the emission direction inclined from the normal direction of the second region 24b by +θ$_3$.

The projection light from the third region 24c has luminance characteristic according to which the luminance is at the maximum value α at its peak in the normal direction of the third region 24c, and is at the value β in the emission direction inclined from the normal direction of the third region 24c by +θ$_2$.

The projection light from the fourth region 24d has luminance characteristic according to which the luminance is at the maximum value α at its peak in the emission direction inclined from the normal direction of the fourth region 24d by −θ$_2$, and is at the value β in the normal direction of the fourth region 24d.

As described above, in the display apparatus 11 according to an embodiment, the direction in which the luminance of projection light from a given micro region 24 in the display surface 22a of the light source device 16 is maximum and the direction in which the luminance of projection light from another micro region 24 in the display surface 22a is maximum are different. Such a structure improves the luminance characteristics of the virtual image 13 visually recognized by the user 12, as described below.

Conventionally known light source devices including transmissive liquid crystal devices typically have a structure in which the direction in which the luminance of projection light from each micro region 24 in the display surface 22a for images is maximum approximately matches the normal direction of the display surface 22a. In the case of that the user 12 visually recognizes the virtual image 13 using a conventionally known light source device, the virtual image 13 has luminance characteristics according to which the luminance is maximum at one point on the virtual image 13 and decreases as the distance from the point increases. Hence, in the case where the user 12 visually recognizes the virtual image 13 from a particular position, the virtual image 13 has uneven luminance.

In the light source device 16 according to an embodiment, on the other hand, the direction in which the luminance of projection light from any micro region 24 in the display surface 22a is maximum and the direction in which the luminance of projection light from another micro region 24 in the display surface 22a is maximum are different. Hence, in the case where the user 12 visually recognizes the virtual image 13 from a particular position, a decrease in luminance at a position away from a point at which the luminance is maximum on the virtual image 13, i.e. luminance unevenness of the virtual image 13, can be reduced.

(Virtual Image 13)

The luminance characteristics of the virtual image 13 may change along the horizontal direction in which the influence of the posture and movement of the user 12 are particularly significant. In this description, the "luminance characteristics of the virtual image 13" denote the dependence of luminance on viewing angle at any one point of the virtual image 13. The expression "the luminance characteristics of the virtual image 13 change along the horizontal direction" therefore means that the dependence of luminance on viewing angle at each point of the virtual image 13 varies along the horizontal direction of the virtual image 13.

The virtual image 13 which the display apparatus 11 according to an embodiment allows the user 12 to visually recognize is described below, with reference to FIG. 9. For example, the virtual image 13 may have an aspect ratio of 1:2. The virtual image 13 may be visually recognized by the user 12, for example, at 2.5 m forward from the eyeballs of the user 12 at a size of vertical 142 mm×horizontal 284 mm. Points on a straight line along the horizontal direction in the vicinity of the vertical center of the virtual image 13 are referred to as a first point A, a second point B, a third point C, a fourth point D, and a fifth point E in order from left to right. The first point A is near the left edge of the virtual image 13. The third point C is a center point of the virtual image 13. The fifth point E is near the right edge of the virtual image 13. The second point B is an intermediate point between the first point A and the third point C. The fourth point D is an intermediate point between the third point C and the fifth point E.

The luminance characteristic at each of the first point A to the fifth point E of the virtual image 13 is described below, with reference to FIG. 10. The horizontal axis represents the viewing angle [°]. The vertical axis represents the luminance [cd/mm²]. When a normal line to the virtual image 13, which passes through a point subjected to attention (attention point) on the virtual image 13, is 0°, the viewing angle indicates the inclination along the horizontal direction between a straight line connecting the eyeballs of the user 12 and the attention point and the normal line. The viewing angle is positive in the case where the eyeballs of the user 12 are on the right side of the normal line.

Figure 10:
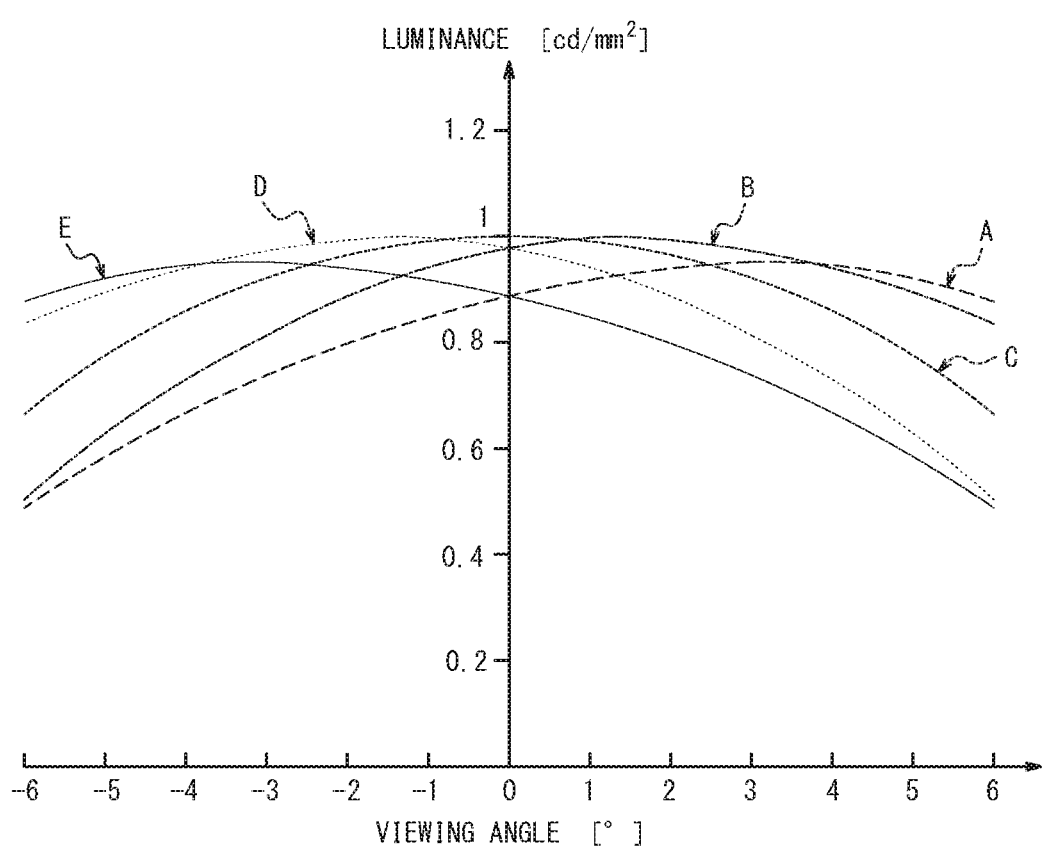
FIG. 10 is a graph illustrating a luminance characteristic at each point of the virtual image in FIG. 9.

As illustrated in FIG. 10, the virtual image 13 has luminance characteristics according to which the dependence of luminance on viewing angle changes along the horizontal direction. In detail, the luminance characteristic at any one point of the virtual image 13 is a luminance characteristic according to which, as compared with the luminance characteristic at another point of the virtual image 13 located on one side (right side or left side) of the point along the horizontal direction, the luminance from the viewing angle on the one side is high. For example, the luminance characteristic at the first point A has a distribution in which the luminance from the viewing angle on the right side is higher than the luminance characteristic at the fifth point E which is another point of the virtual image 13 located on the right side along the horizontal direction from the first point A which is one point of the virtual image 13, as illustrated in FIG. 10.

Figure 9:
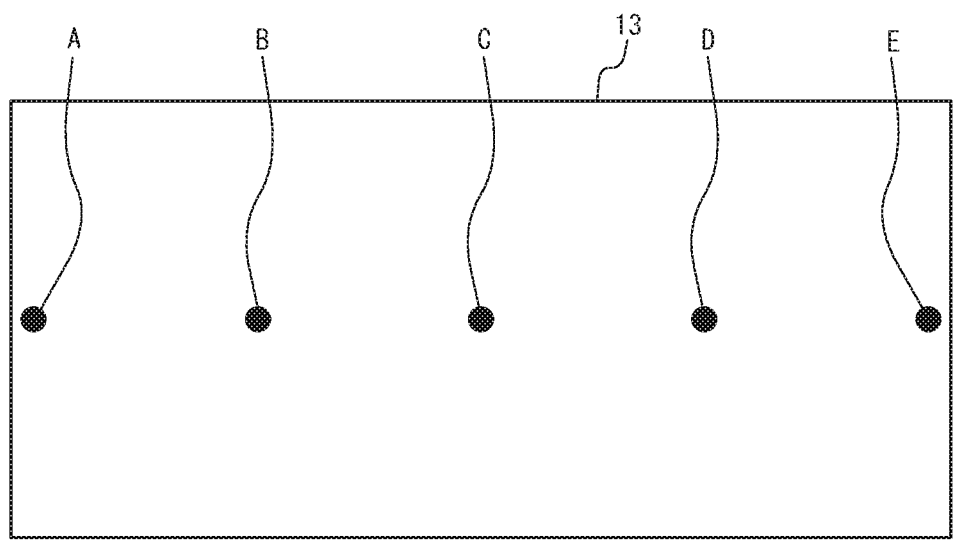
FIG. 9 is a schematic diagram of a virtual image which is visually recognized by a user via the display apparatus in FIG. 1.

Although FIG. 10 illustrates the luminance characteristics at intermittent points, i.e. the first point A to the fifth point E of the virtual image 13 illustrated in FIG. 9, the luminance characteristics of the virtual image 13 continuously vary along the horizontal direction on the virtual image 13.

Moreover, the luminance characteristic at the third point C which is the center point of the virtual image 13 is a luminance characteristic according to which the luminance from the viewing angle (0°) in the normal direction to the virtual image 13 is maximum and the luminance from the viewing angles on both sides of the normal line as the center along the horizontal direction is symmetric, as illustrated in FIG. 10. For example, in the luminance characteristic at the third point C, the luminance takes a maximum value when the viewing angle is "0°". Further, in the luminance characteristic at the third point C, the luminance is approximately equal when the absolute value of the viewing angle is equal. For example, the luminance when the viewing angle is "1°" and the luminance when the viewing angle is "–1°" are approximately equal. Moreover, the luminance when the viewing angle is "3°" and the luminance when the viewing angle is "–3°" are approximately equal.

In addition, the luminance characteristic at any one point other than the third point C which is the center point of the virtual image 13 has asymmetry, as illustrated in FIG. 10. The asymmetry is distributed symmetrically along the horizontal direction with respect to, as the center, the third point C which is the center point of the virtual image 13. For example, in the luminance characteristic at any of the first point A, the second point B, the fourth point D, and the fifth point E other than the third point C, the luminance from the viewing angles on both sides along the horizontal direction is asymmetric. Moreover, the respective luminance characteristics at the second point B and the fourth point D located at the same distance from the third point C along the horizontal direction have the relationship that they are symmetric with regard to the viewing angle, i.e. the positive and negative viewing angles are interchanged.

The operation of the display apparatus 11 according to an embodiment is described below.

Figure 11:
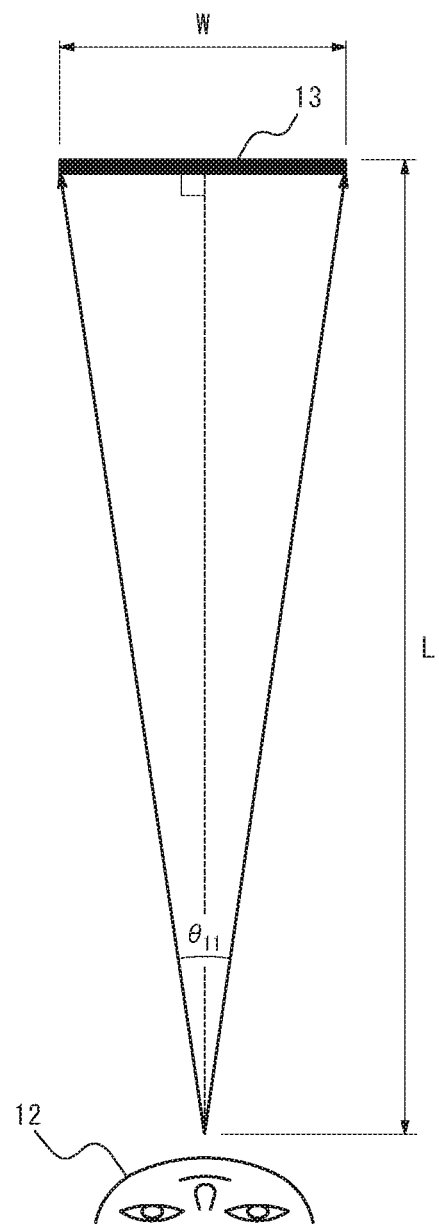
FIG. 11 is a top view illustrating the positional relationship between the virtual image and the user when the user views the virtual image from the center front of the virtual image.

The positional relationship between the virtual image 13 and the user 12 is described below, with reference to FIG. 11. FIG. 11 illustrates the positional relationship when the user 12 views the virtual image 13 from the center front of the virtual image 13, i.e. from the normal line passing through the third point C which is the center point of the virtual image 13. The width W of the virtual image 13 in the horizontal direction is about 284 mm. The distance L between the eyeballs of the user 12 and the virtual image 13 is about 2500 mm. Accordingly, the viewing angle $\theta_{11}$ from the eyeballs of the user 12 to both horizontal edges of the virtual image 13 is about 6.50°.

Figure 12:
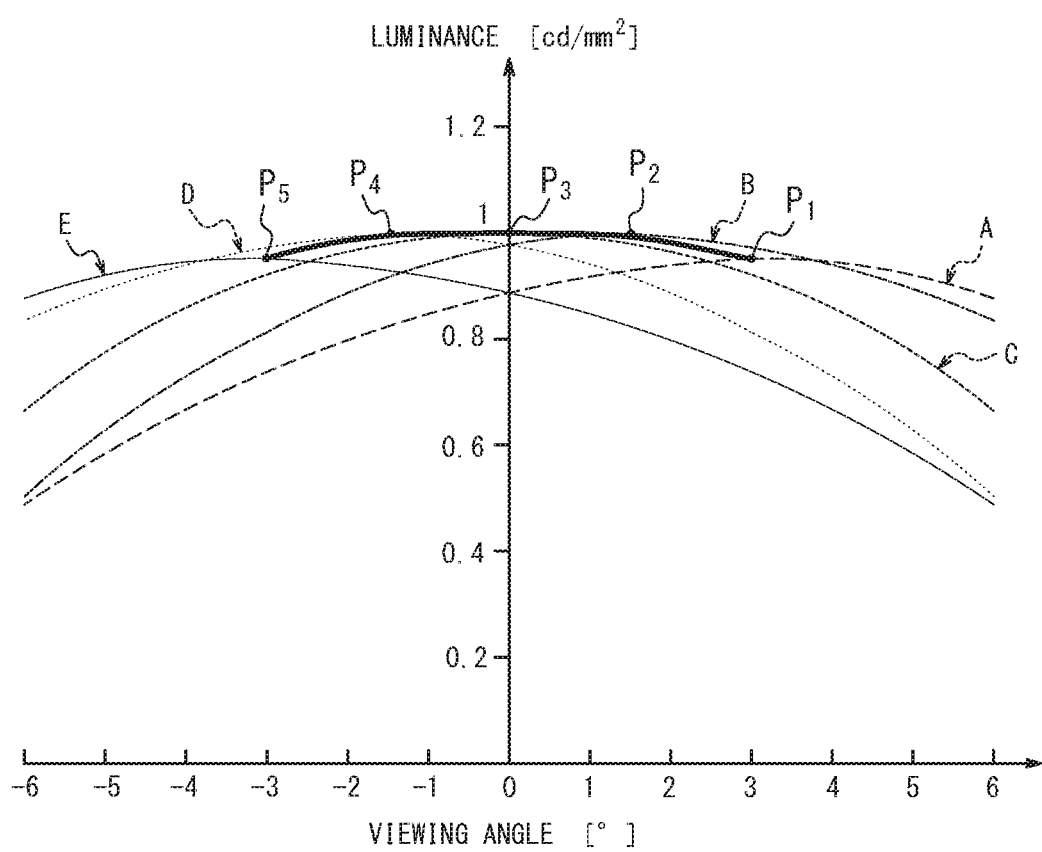
FIG. 12 is a diagram illustrating the luminance distribution of the display surface visually recognized by the user in the positional relationship illustrated in FIG. 11.

The luminance distribution of the virtual image 13 visually recognized by the user 12 in the positional relationship illustrated in FIG. 11 is described below, with reference to FIG. 12. In this positional relationship, the viewing angles at the respective points of the virtual image 13 to the eyeballs of the user 12 are: about 3.0° at the first point A; about 1.5° at the second point B; about 0° at the third point C; about –1.5° at the fourth point D; and about –3.0° at the fifth point E. FIG. 12 adds an approximate curve to the graph of the respective luminance characteristics of the first point A to the fifth point E illustrated in FIG. 10, where the coordinates corresponding to the above-mentioned viewing angles to the eyeballs of the user 12 are denoted as $P_1$ to $P_5$.

As illustrated in FIG. 12, when the user 12 views the virtual image 13 from the normal line passing through the center point of the virtual image 13, the luminance of the virtual image 13 visually recognized by the user 12 is distributed throughout the horizontal direction of the virtual image 13 while keeping a comparatively high value. Thus, when the user 12 views the virtual image 13 from the center front of the virtual image 13, high luminance uniformity is obtained.

Figure 13:
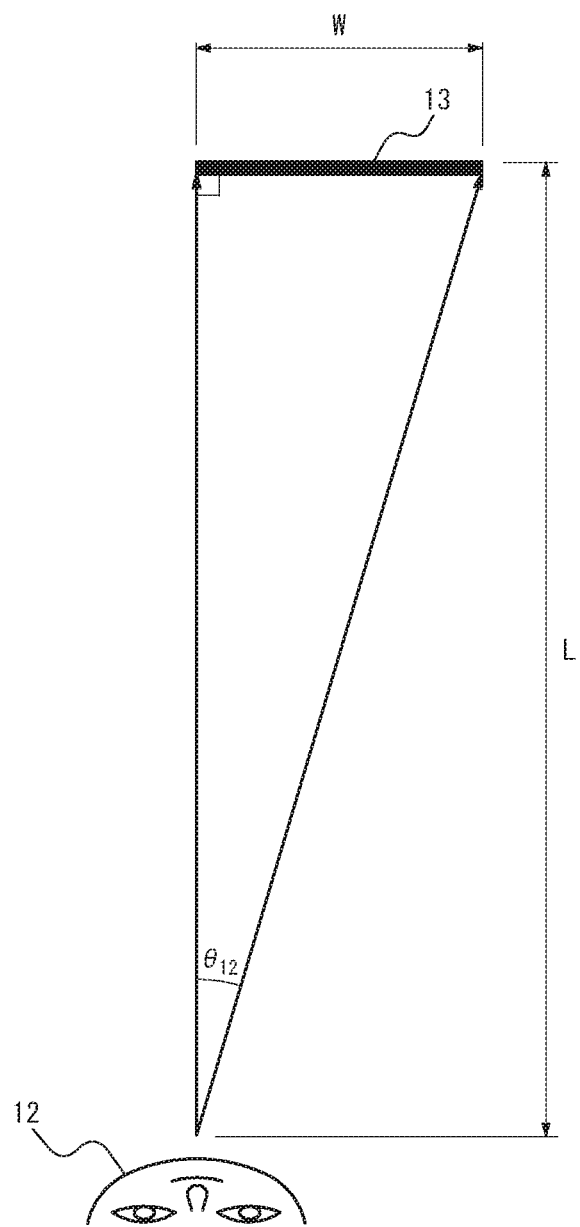
FIG. 13 is a top view illustrating the positional relationship between the virtual image and the user when the user views the virtual image from the left-edge front of the virtual image.

The positional relationship between the virtual image 13 and the user 12 is described below, with reference to FIG. 13. FIG. 13 illustrates the positional relationship when the user 12 views the virtual image 13 from the left-edge front of the virtual image 13, i.e. from the normal line passing through the left edge of the virtual image 13. The width W of the virtual image 13 in the horizontal direction is about 284 mm, as mentioned above. The distance L between the eyeballs of the user 12 and the virtual image 13 is about 2500 mm, as mentioned above. Accordingly, the viewing angle $\theta_{12}$ from the eyeballs of the user 12 to both horizontal edges of the virtual image 13 is about 6.48°.

Figure 14:
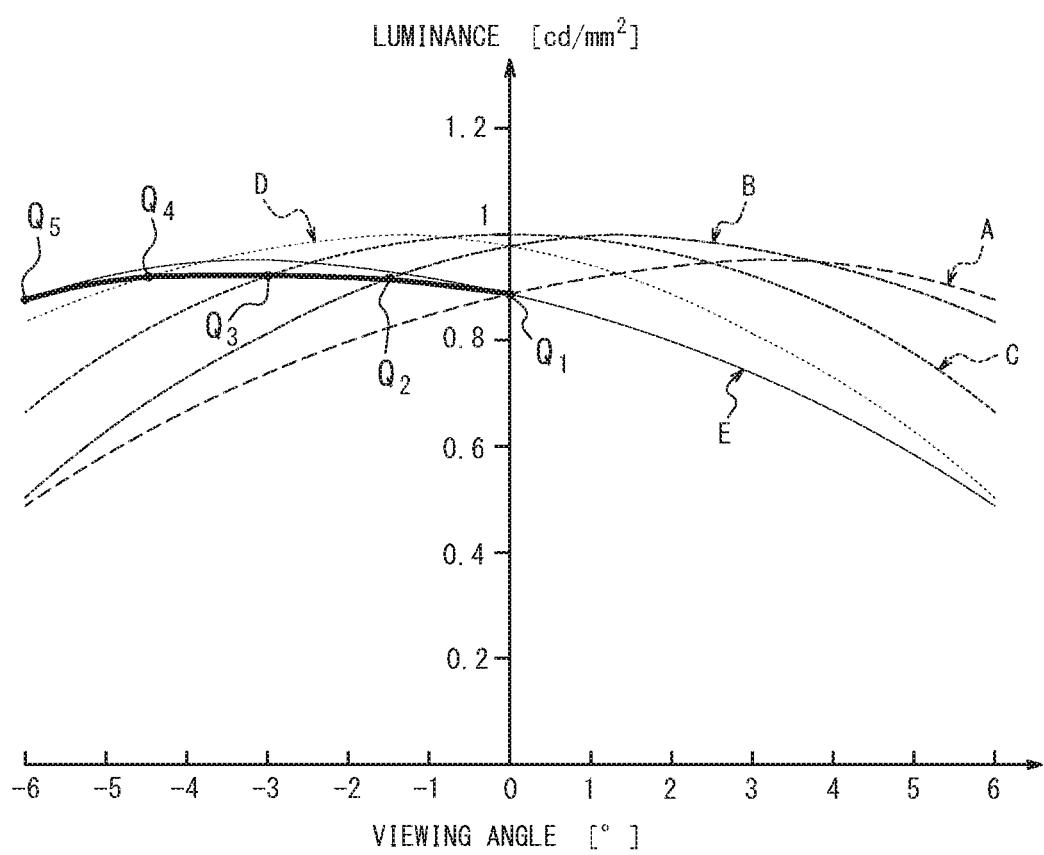
FIG. 14 is a diagram illustrating the luminance distribution of the display surface visually recognized by the user in the positional relationship illustrated in FIG. 13.

The luminance distribution of the virtual image 13 visually recognized by the user 12 in the positional relationship illustrated in FIG. 13 is described below, with reference to FIG. 14. In this positional relationship, the viewing angles at the respective points of the virtual image 13 to the eyeballs of the user 12 are: about 0° at the first point A; about –1.5° at the second point B; about –3.0° at the third point C; about –4.5° at the fourth point D; and about –6.0° at the fifth point E. FIG. 14 adds an approximate curve to the graph of the respective luminance characteristics of the first point A to the fifth point E illustrated in FIG. 10, where the coordinates corresponding to the above-mentioned viewing angles to the eyeballs of the user 12 are denoted as $Q_1$ to $Q_5$.

As illustrated in FIG. 14, when the user 12 views the virtual image 13 from the normal line passing through the left edge of the virtual image 13, the luminance of the virtual image 13 visually recognized by the user 12 is distributed throughout the horizontal direction of the virtual image 13 while keeping a comparatively high value. Thus, when the user 12 views the virtual image 13 from the left-edge front of the virtual image 13, high luminance uniformity is obtained as well. Moreover, the luminance characteristics at any points other than the third point C which is the center point of the virtual image 13 are distributed symmetrically along the horizontal direction with respect to the third point C as the center, as mentioned above. Therefore, when the user 12 views the virtual image 13 from the right-edge front of the virtual image 13, high luminance uniformity is equally obtained.

The luminance visual characteristics of the virtual image 13 change continuously along the horizontal direction on the virtual image 13, as mentioned above. Thus, when the user 12 views the virtual image 13 from the front of any one point of the virtual image 13, high luminance uniformity is obtained.

As described above, with the display apparatus 11 according to an embodiment, the luminance characteristics of the virtual image 13 change along the horizontal direction. A high-output light source for ensuring certain luminance in the normal direction is therefore unnecessary. Hence, high luminance uniformity can be ensured within a certain viewing angle range, while controlling an increase in power consumption.

Moreover, with the display apparatus 11 according to an embodiment, the luminance characteristic at any one point of the virtual image 13 is a luminance characteristic according to which, as compared with the luminance characteristic at another point of the virtual image 13 located on one side (e.g. right side) of the point along the horizontal direction, the luminance from the viewing angle on the one side is high. Hence, high luminance uniformity can be ensured within a certain viewing angle range more reliably.

Moreover, with the display apparatus 11 according to an embodiment, the luminance characteristic at the center point of the virtual image 13 is a luminance characteristic according to which the luminance from the viewing angle in the normal direction to the virtual image 13 is maximum and the luminance from the viewing angles on both sides of the normal line as the center along the horizontal direction is symmetric. This allows the user 12 at the center front of the virtual image 13 to visually recognize the virtual image 13 with high luminance.

Moreover, with the display apparatus 11 according to an embodiment, the luminance characteristic at any one point other than the center point of the virtual image 13 has asymmetry. The asymmetry is distributed symmetrically along the horizontal direction with respect to the center point of the virtual image 13 as the center. This allows the user 12 to visually recognize the virtual image 13 whose luminance is symmetric in the horizontal direction, i.e. without luminance unevenness on either of the right and left sides.

Moreover, with the display apparatus 11 according to an embodiment, the luminance characteristics of the virtual image 13 are adjusted by the light distribution to the display 22 by the lighting optical system. Hence, high luminance uniformity can be ensured within a certain viewing angle range, while suppressing an increase in power consumption by controlling a decrease in luminance.

While the disclosed technique has been described by way of the drawings and embodiments, various changes or modifications may be easily made by those of ordinary skill in the art based on the present disclosure. Such various changes or modifications are therefore included in the scope of the present disclosure. For example, the functions included in the components, steps, etc. may be rearranged without logical inconsistency, and a plurality of components, steps, etc. may be combined into one component, step, etc. and a component, step, etc. may be divided into a plurality of components, steps, etc.

Although the above describes the case where the luminance characteristics of the virtual image 13 change along the horizontal direction, the horizontal direction is not a limitation. The luminance characteristics of the virtual image 13 may change along any certain direction such as the vertical direction, or change along any two or more certain directions.

Although the above describes the case where the luminance characteristics of the virtual image 13 are adjusted by the light distribution to the display 22 by the lighting optical system, the adjustment by the lighting optical system is not a limitation. The light distribution to the display 22 may be adjusted by how a plurality of LEDs as the light source element 19 are arranged.

REFERENCE SIGNS LIST 10 mobile object
11 display apparatus
12 user
13 virtual image
14 first optical member
15 eyebox
16, 16a, 16b light source device
17, 17a, 17b second optical member
18 substrate
19 light source element
20 third optical member (lighting optical system)
20a first lens (lighting optical system)
21 fourth optical member (lighting optical system)
21a second lens (lighting optical system)
22 display
22a display surface
23 controller
24 micro region
24a first region
24b second region
24c third region
24d fourth region
25 first position
26 second position
27 diffuser (lighting optical system)
28 prism sheet (lighting optical system)

The invention claimed is:

1. A display apparatus via which a user visually recognizes a virtual image of an image, the display apparatus comprising:
a light source device having a display surface for displaying the image; and
one or more optical members configured to cause projection light of the image from the display surface to reach a certain region in a real space,
wherein a first direction in which luminance of projection light from a first region in the display surface is maximum and a second direction in which luminance of projection light from a second region in the display surface is maximum are different, and
at each of a center position of an eyebox from which the user visually recognizes the virtual image and other positions of the eyebox which are different from the center position of the eyebox, luminance of the center point of the virtual image is maximum within a luminance distribution of the virtual image.

2. The display apparatus according to claim 1,
wherein the first region in the display surface is a region in which a first part of the image is displayed on the display surface, and
the second region in the display surface is a region in which a second part of the image is displayed on the display surface.

3. The display apparatus according to claim 1,
wherein the display surface includes a third region for which luminance of projection light is maximum in a normal direction,
the first direction is inclined from a normal direction of the first region toward the third region, and
the second direction is inclined from a normal direction of the second region toward the third region.

4. The display apparatus according to claim 3,
wherein a first distance between the first region and the third region is longer than a second distance between the second region and the third region, and
a first angle between the normal direction of the first region and the first direction is greater than a second angle between the normal direction of the second region and the second direction.

5. A mobile object via which a user visually recognizes a virtual image of an image, the mobile object comprising:
a light source device having a display surface for displaying the image; and
one or more optical members configured to cause projection light of the image from the display surface to reach a certain region in a real space,
wherein a first direction in which luminance of projection light from a first region in the display surface is maximum and a second direction in which luminance of projection light from a second region in the display surface is maximum are different, and
at each of a center position of an eyebox from which the user visually recognizes the virtual image and other positions of the eyebox which are different from the center position of the eyebox, luminance of the center point of the virtual image is maximum within a luminance distribution of the virtual image.

6. The mobile object according to claim 5,
wherein the one or more optical members include a windshield or a combiner.

7. A light source device of a display apparatus via which a user visually recognizes a virtual image of an image, comprising:
a light source element;
a display having a display surface for displaying an image; and
a lighting optical system configured to irradiate the display with light from the light source element,
wherein a first direction in which luminance of projection light from a first region in the display surface is maximum and a second direction in which luminance of projection light from a second region in the display surface is maximum are different, and
at each of a center position of an eyebox from which the user visually recognizes the virtual image and other positions of the eyebox which are different from the center position of the eyebox, luminance of the center point of the virtual image is maximum within a luminance distribution of the virtual image.

* * * * *